US012658707B2

(12) United States Patent
Luo et al.

(10) Patent No.: US 12,658,707 B2
(45) Date of Patent: Jun. 16, 2026

(54) METHOD FOR OPERATING ENERGY STORAGE SYSTEM AND ENERGY STORAGE SYSTEM

(71) Applicant: Anker Innovations Technology Co., Ltd., Changsha (CN)

(72) Inventors: Jianlin Luo, Shenzhen (CN); Wei Chen, Shenzhen (CN); Yiyong Li, Shenzhen (CN)

(73) Assignee: Anker Innovations Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/016,584

(22) Filed: Jan. 10, 2025

(65) Prior Publication Data

US 2025/0233419 A1      Jul. 17, 2025

(30) Foreign Application Priority Data

Jan. 12, 2024      (CN) .......................... 202410051327.5

(51) Int. Cl.
| | |
|---|---|
| *H02J 3/32* | (2026.01) |
| *H02J 7/02* | (2016.01) |
| *H02J 7/80* | (2026.01) |
| *H02J 105/12* | (2026.01) |

(52) U.S. Cl.
CPC   *H02J 3/32* (2013.01); *H02J 7/02* (2013.01); *H02J 7/80* (2026.01); *H02J 2105/12* (2026.01)

(58) Field of Classification Search
CPC ........ H02J 3/32; H02J 7/80; H02J 7/02; H02J 2105/12; H02J 105/12
See application file for complete search history.

(56) References Cited

FOREIGN PATENT DOCUMENTS

CN            120320436 A  *  7/2025  ................ H02J 3/28

* cited by examiner

*Primary Examiner* — Robert L Deberadinis
(74) *Attorney, Agent, or Firm* — Banner & Witcoff, Ltd.

(57)            ABSTRACT

A method for operating an energy storage system and an energy storage system are disclosed. The energy storage device is coupled to a first switching device of the energy storage system via a live wire, the first switching device is coupled to a current transformer of the energy storage system via the live wire, and the current transformer is configured to access the external power grid. By switching on the first switching device, the energy storage device can be controlled to access the external power grid, enabling charging or discharging of the energy storage device through the external power grid. Thereafter, based on a difference value between an on-load electrical parameter and a static electrical parameter of the live wire, the connection status of the current transformer is analyzed to set the operating mode of the energy storage system.

20 Claims, 7 Drawing Sheets

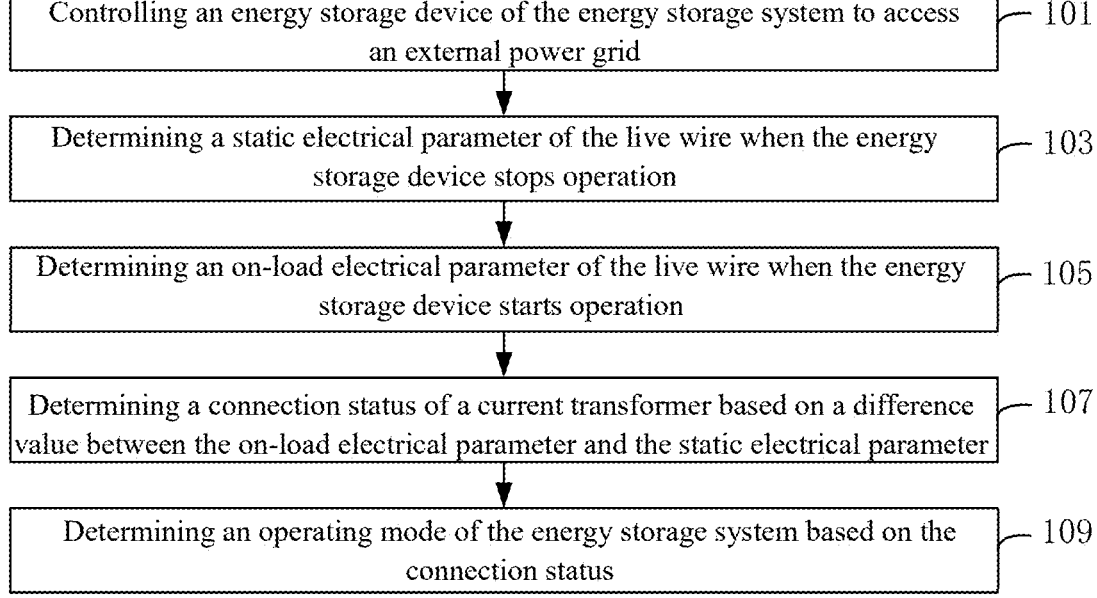

Controlling an energy storage device of the energy storage system to access an external power grid — 101

Determining a static electrical parameter of the live wire when the energy storage device stops operation — 103

Determining an on-load electrical parameter of the live wire when the energy storage device starts operation — 105

Determining a connection status of a current transformer based on a difference value between the on-load electrical parameter and the static electrical parameter — 107

Determining an operating mode of the energy storage system based on the connection status — 109

Fig. 1

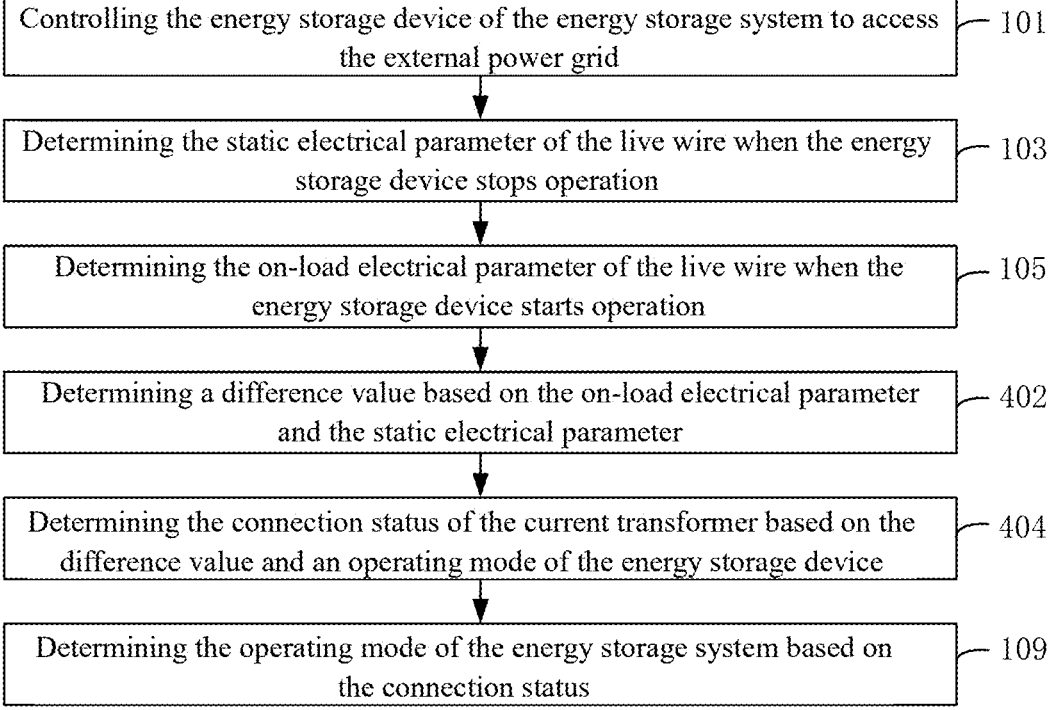

| Controlling the energy storage device of the energy storage system to access the external power grid | 101 |

| Determining the static electrical parameter of the live wire when the energy storage device stops operation | 103 |

| Determining the on-load electrical parameter of the live wire when the energy storage device starts operation | 105 |

| Determining a difference value based on the on-load electrical parameter and the static electrical parameter | 402 |

| Determining the connection status of the current transformer based on the difference value and an operating mode of the energy storage device | 404 |

| Determining the operating mode of the energy storage system based on the connection status | 109 |

Fig. 4

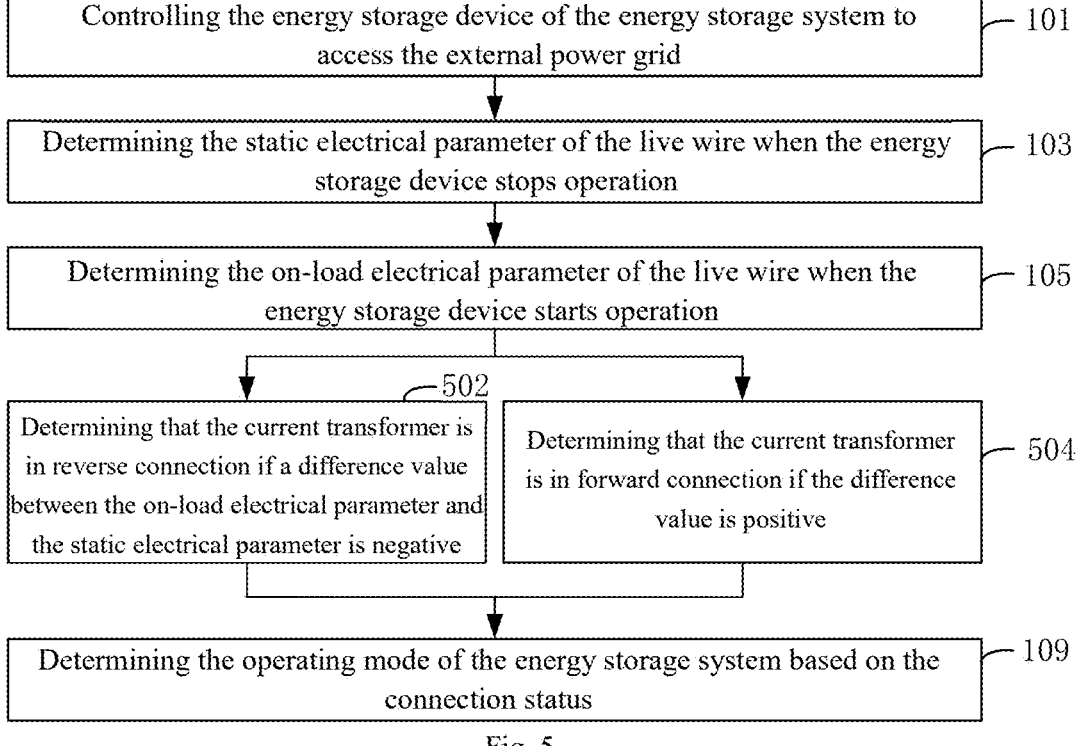

| Controlling the energy storage device of the energy storage system to access the external power grid | — 101 |

↓

| Determining the static electrical parameter of the live wire when the energy storage device stops operation | — 103 |

↓

| Determining the on-load electrical parameter of the live wire when the energy storage device starts operation | — 105 |

┌─502

| Determining that the current transformer is in reverse connection if a difference value between the on-load electrical parameter and the static electrical parameter is negative | | Determining that the current transformer is in forward connection if the difference value is positive | — 504 |

↓

| Determining the operating mode of the energy storage system based on the connection status | — 109 |

Fig. 5

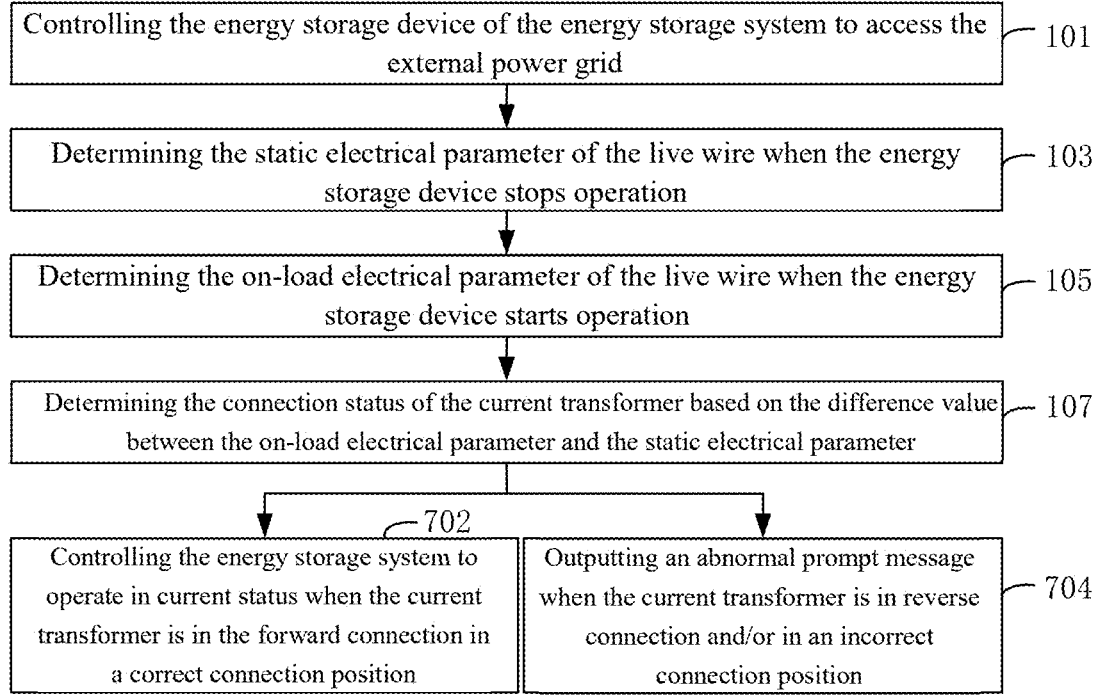

| Controlling the energy storage device of the energy storage system to access the external power grid | — 101 |

| Determining the static electrical parameter of the live wire when the energy storage device stops operation | — 103 |

| Determining the on-load electrical parameter of the live wire when the energy storage device starts operation | — 105 |

| Determining the connection status of the current transformer based on the difference value between the on-load electrical parameter and the static electrical parameter | — 107 |

— 702

| Controlling the energy storage system to operate in current status when the current transformer is in the forward connection in a correct connection position |

| Outputting an abnormal prompt message when the current transformer is in reverse connection and/or in an incorrect connection position | — 704 |

Fig. 7

METHOD FOR OPERATING ENERGY STORAGE SYSTEM AND ENERGY STORAGE SYSTEM

CROSS-REFERENCE TO RELATED APPLICATIONS

This application claims priority to and the benefit of Chinese Patent Application No. 202410051327.5, filed Jan. 12, 2024, and entitled "METHOD FOR OPERATING ENERGY STORAGE SYSTEM AND ENERGY STORAGE SYSTEM," the contents of which are incorporated herein in its entirety.

FIELD

The present disclosure relates to the technical field of energy storage, in particular to a method for operating an energy storage system and an energy storage system.

BACKGROUND

With continuous advancement of energy storage technology, portable power systems (PPS) that are easy to carry have emerged and are widely used in scenarios such as home energy storage, outdoor travel, and emergency preparedness. During operation of the portable energy storage system, it is generally necessary to detect electric current and/or power to control operation of the energy storage system. Therefore, a current transformer (CT) is typically installed on the live wire at a power grid connection side of the portable energy storage system.

However, current transformers are directional, and incorrect installation such as reverse connection often affects the accuracy of the electric current and/or power measurement in the current transformers, leading to technical issues in related applications.

SUMMARY

Based on this, it is necessary to provide a method for operating an energy storage system and an energy storage system to improve accuracy of detecting electric current and/or power.

A method for operating an energy storage system is disclosed. The energy storage system comprises an energy storage device, a first switching device, and a current transformer; a first end of the first switching device is coupled to the energy storage device via a live wire, and a second end of the first switching device is coupled to the current transformer via the live wire; the current transformer is coupled to an external power grid. The method for operating an energy storage system comprises: controlling the energy storage device of the energy storage system to access the external power grid; determining a static electrical parameter of the live wire when the energy storage device stops operation; determining an on-load electrical parameter of the live wire when the energy storage device starts operation; determining connection status of the current transformer based on a difference value between the on-load electrical parameter and the static electrical parameter; and determining and setting an operating mode of the energy storage system based on the connection status.

An energy storage system comprises an energy storage device, a first switching device, and a current transformer; a first end of the first switching device is coupled to the energy storage device via a live wire, and a second end of the first switching device is coupled to the current transformer via the live wire; the current transformer is coupled to an external power grid; and the control device is configured to perform the above method for operating the energy storage system.

In the above method for operating the energy storage system and the energy storage system, the energy storage device is coupled to the first switching device of the energy storage system via the live wire, the first switching device is coupled to the current transformer of the energy storage system via the live wire, and the current transformer is configured to access the external power grid. By switching on the first switching device, the energy storage device can be controlled to access the external power grid, enabling charging or discharging of the energy storage device through the external power grid. When the energy storage device accesses the external power grid, and the energy storage device stops operation, the static electrical parameter of the live wire can be determined; when the energy storage device starts operation, the on-load electrical parameter of the live wire can be determined. Thereafter, based on the difference value between the on-load electrical parameter and the static electrical parameter, the connection status of the current transformer is analyzed to determine and set the operating mode of the energy storage system. According to the technical solution, the static electrical parameter and the on-load electrical parameter of the live wires coupled to the energy storage device and the current transformer can be detected and obtained respectively based on the operation condition of the energy storage device during operation of the energy storage system, and the connection status of the current transformer provided at the live wire is detected with the static electrical parameter and the on-load electrical parameter to determine and set the operating mode of the energy storage system according to the connection status of the current transformer. According to the technical solution, the connection status of the current transformer can be detected in real time, thereby obtaining the connection status of the current transformer on the live wire, avoiding long-time operation of the current transformer in reverse connection, ensuring the parameter obtainment of the current transformer in forward connection, and improving accuracy of detecting the electric current and/or power.

BRIEF DESCRIPTION OF THE DRAWINGS

In order to more clearly illustrate examples of the disclosure or technical solutions in the related art, drawings that need to be used in description of the examples or the related art are briefly introduced below. It will be apparent to those of ordinary skill in the art that the drawings in the following description only show some examples of the disclosure, and other drawings can be obtained from these drawings without inventive work.

FIG. 1 is a schematic flowchart of a method for operating an energy storage system according to an example of the present disclosure;

FIG. 4 is a schematic flowchart of a method for operating an energy storage system according to another example of the present disclosure;

FIG. 5 is a schematic flowchart of a method for operating an energy storage system according to yet another example of the present disclosure;

FIG. 7 is a schematic flowchart of a method for operating an energy storage system according to still another example of the present disclosure.

DETAILED DESCRIPTION

In order to facilitate understanding of the present disclosure, the present disclosure will be described comprehensively below with reference to the accompanying drawings. Preferred examples of the present disclosure are shown in the accompanying drawings. However, the present disclosure may be implemented in many different forms and is not limited to the examples described herein. Rather, these examples are provided to understand contents of the disclosure thoroughly and comprehensively.

The methods for operating an energy storage system according to the examples of the present disclosure are applied to energy storage systems, specifically to those utilizing current transformers to monitor electric current and/or power. The energy storage system may be a portable energy storage system or other types of energy storage systems, such as photovoltaic energy storage systems and wind energy storage systems, without limitation. For ease of understanding, the energy storage system may be understood as a portable energy storage system in the following examples. Correspondingly, the electric loads may refer to common household electric loads, including household backup loads and household non-backup loads, without limitation.

Referring to FIG. 1, a method for operating an energy storage system includes steps 101, 103, 105, 107, and 109.

Step 101: controlling an energy storage device of the energy storage system to access an external power grid.

Figure 2:
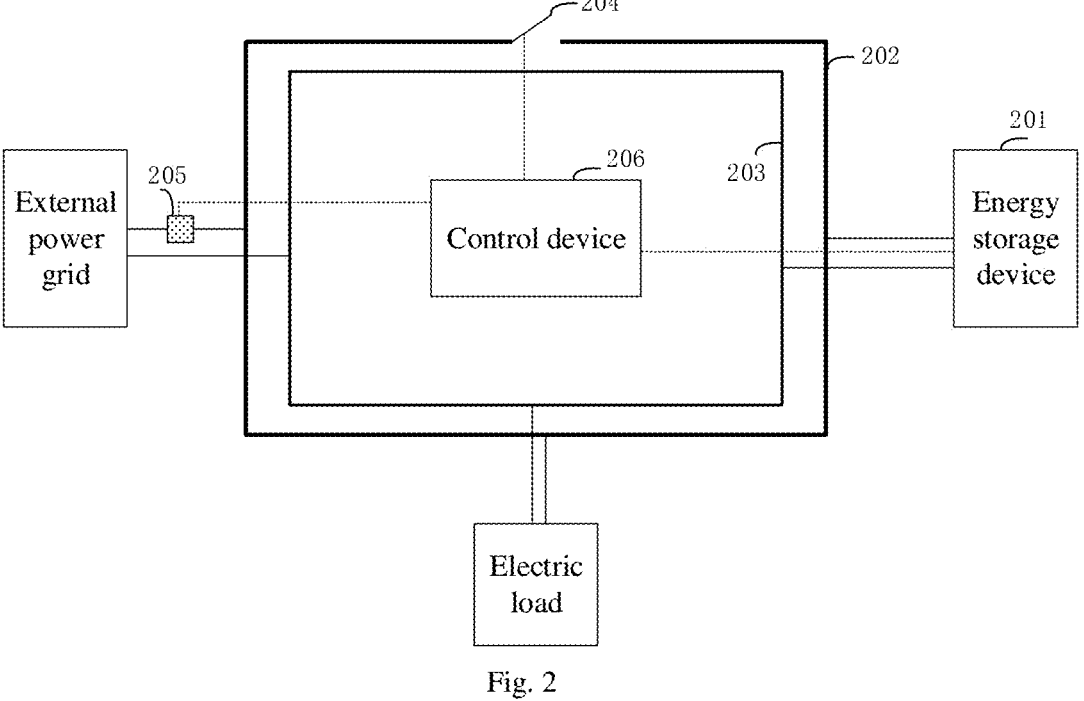
FIG. 2 is a schematic structural diagram of an energy storage system according to an example of the present disclosure.

Specifically, referring to FIG. 2, the energy storage system includes an energy storage device 201, a first switching device 204, and a current transformer 205. A first end of the first switching device 204 is coupled (e.g., connected) to the energy storage device 201 via a live wire 202, and a second end of the first switching device 204 is connected to the current transformer 205 via the live wire 202. The current transformer 205 is configured to access the external power grid.

The energy storage device 201 is a device capable of storing electric energy and providing the stored energy for electric loads under certain conditions, and its specific type is not limited. In an example, the energy storage device 201 may be a PPS energy storage device commonly used in the portable energy storage system. Furthermore, the number of energy storage devices 201 is not one and may be provided based on actual needs of the energy storage system. The system may include one energy storage device 201 or two or more energy storage devices 201, which can be connected in series and/or parallel, without limitation.

The energy storage device 201 may be provided with at least one live wire end based on actual needs. For example, in a 220V (volt) electric scenario, one live wire end may be provided for the energy storage device 201 to enable charging and discharging operations under the control of a control device 206. In a 110V electric scenario, two live wire ends may be provided for the energy storage device 201 to enable charging and discharging operations under the control of the control device 206. In an example, in a three-phase electric scenario, three live wire ends may be provided for the energy storage device 201, without limitation.

Accordingly, each live wire end is connected to one live wire 202, which realizes corresponding power transfer to the external power grid or the electric load via the live wire 202.

The specific type of the first switching device 204 is not limited. In an example, it may be a relay; in other examples, it may be an isolation switch, a circuit breaker or similar devices, without limitation. The example considers that the power transmission is primarily carried out via the live wire 202. When the live wire 202 is disconnected, the power transmission operation is interrupted. Therefore, the first switching device 204 is installed only on the live wire 202. The connection between the energy storage device 201 and the external power grid can be enabled or disabled by controlling the on/off state of the first switching device 204.

Figure 3:
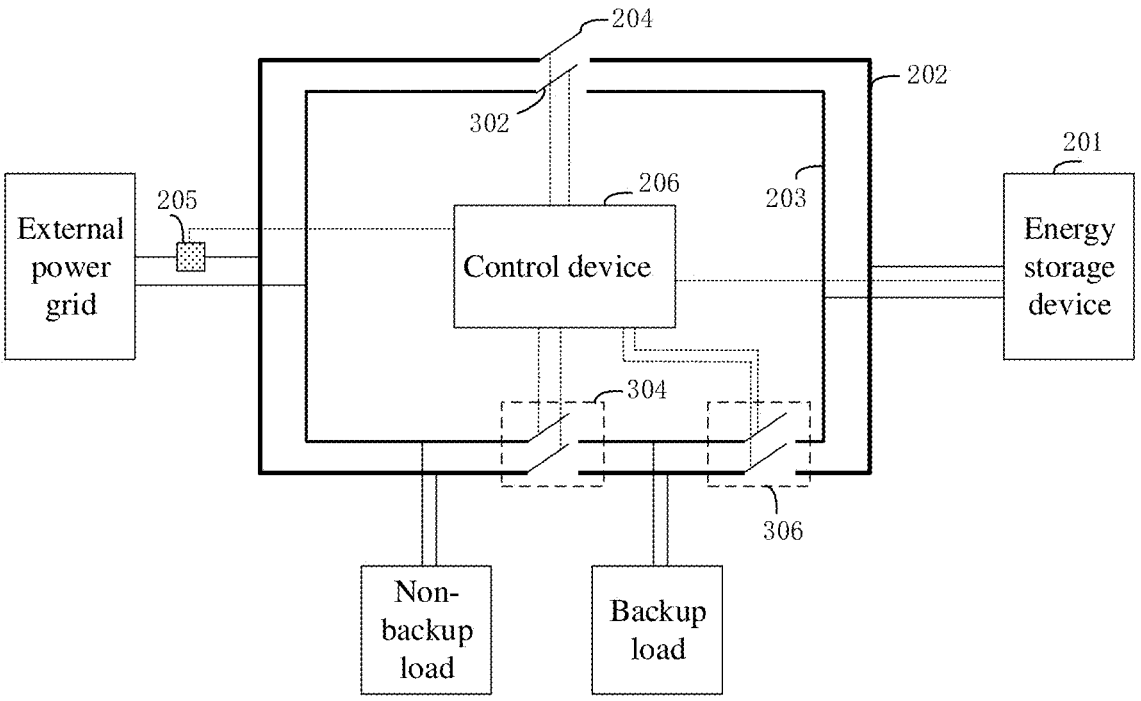
FIG. 3 is a schematic structural diagram of an energy storage system according to another example of the present disclosure.

Referring to FIG. 3, it can be understood that in another example, to enhance operational safety of the energy storage system, a second switching device 302 may be provided on a neutral wire 203 of the energy storage system. The neutral wire 203 end of the energy storage device 201 is coupled to the second switching device 302 via the neutral wire 203, and the second switching device 302 is coupled to the external power grid and the electric load via the neutral wire 203. Accordingly, in the example, controlling the energy storage device 201 to access the external power grid requires simultaneously switching on both the first switching device 204 and the second switching device 302.

Furthermore, in an example, to prevent the electric load from affecting the analysis accuracy of the connection status of the current transformer 205, the energy storage system further includes a third switching device 304 and a fourth switching device 306. Referring to FIG. 3, the electric load includes a non-backup load and a backup load. The non-backup load is connected to the external power grid via the live wire 202 and operates directly with the electric energy transmitted by the external power grid. The third switching device 304 is positioned on the live wire 202 between the non-backup load and the backup load, while the fourth switching device 306 is positioned on the live wire 202 between the backup load and the energy storage device 201. Thus, when the energy storage device 201 stops operation, the non-backup load can operate with the electric energy transmitted by the external power grid. When both the third switching device 304 and the fourth switching device 306 are switched off, the backup load stops operation. When the third switching device 304 is switched on and the fourth switching device 306 is switched off, the backup load can operate with the electric energy transmitted by the external power grid. When the energy storage device 201 starts operation, and the third switching device 304 is switched off while the fourth switching device 306 is switched on, the backup load can operate with the electric energy transmitted by the energy storage device 201.

It can be understood that in another example, to enhance electrical safety, the third switching device 304 may be provided on both the live wire 202 and the neutral wire 203 between the non-backup load and the backup load. Similarly, the fourth switching device 306 may be provided on both the live wire 202 and the neutral wire 203 between the backup load and the energy storage device 201.

Accordingly, when the energy storage system further includes the third switching device 304 and the fourth switching device 306, controlling the energy storage device 201 of the energy storage system to access the external power grid requires switching on the first switching device 204 and simultaneously switching off the third switching device 304 and the fourth switching device 306.

Step 103: determining a static electrical parameter of the live wire when the energy storage device stops operation.

Specifically, when the energy storage device stops operation, it is connected to the external power grid, but no power is transmitted between them, meaning the energy storage device neither charges nor discharges. The static electrical parameter of the live wire is determined by collecting and analyzing the electrical parameter of the live wire between the energy storage device and the external power grid when the energy storage device is neither charging nor discharging.

After the energy storage device is connected to the external power grid, the first switching device is kept in a closed state (if the third switching device and the fourth switching device are provided, they should both be disconnected). The control device then sets the energy storage device to an off state, thereby measuring and determining the static electrical parameter of the live wire at this time.

Step 105: determining an on-load electrical parameter of the live wire when the energy storage device starts operation.

Specifically, when the energy storage device starts operation, it is connected to the external power grid, and electric energy is transmitted between the energy storage device and the external power grid. The energy storage device may either charge through the external power grid or discharge to it. The on-load electrical parameter of the live wire refers to the electrical parameter determined by the control device by collecting and analyzing the electrical parameter of the live wire between the energy storage device and the external power grid when the electric load is operating on the live wire during the charging or discharging operation of the energy storage device.

After the energy storage device is connected to the external power grid, the first switching device is kept in a closed state. At this time, the electric load is connected to the live wire, and operates with the electric energy transmitted by the external power grid, e.g., the energy storage system is in an on-load operation status. The control device then measures the live wire to determine the on-load electrical parameter.

Step 107: determining connection status of a current transformer based on a difference value between the on-load electrical parameter and the static electrical parameter.

Specifically, in actual operating scenarios, the on-load electrical parameter obtained by measuring the live wire of the energy storage system will show a certain degree of change relative to the static electrical parameter. Depending on the connection status of the current transformer, the form of change in the on-load electrical parameter relative to the static electrical parameter will also differ. Therefore, by the technical solution of the example of the present disclosure, a difference value reflecting the change in the on-load electrical parameter relative to the static electrical parameter is obtained by subtracting the static electrical parameter from the on-load electrical parameter to determine the connection status of the current transformer, e.g., to analyze whether the current transformer is in reverse connection and/or is connected in the correct position (e.g., whether being coupled to the corresponding live wire).

Step 109: determining and setting an operating mode of the energy storage system based on the connection status.

Specifically, the operating mode refers to the current operating status of the energy storage system, which may vary depending on the type of the connection status determined. In an example, if the connection status of the current transformer is detected as forward connection status, the corresponding operating mode of the energy storage system is the forward operating mode. If the connection status of the current transformer is detected as reverse connection status, the corresponding operating mode of the energy storage system is the reverse operating mode. Furthermore, in an example, when the connection status of the current transformer is forward connection status, whether the energy storage system is operating normally may be further determined based on the range of the difference value between the electrical parameters. Accordingly, in this case, the operating mode includes normal operation and abnormal operation.

It should be noted that in the above examples, determining and setting the operating mode of the energy storage system is based on identifying the current operating mode of the energy storage system. In other examples, determining and setting the operating mode of the energy storage system may also involve controlling the energy storage system to enter the corresponding operating mode. For example, in an example, the operating mode includes outputting a forward connection prompt message or a reverse connection prompt message. When the control device detects that the current transformer is in the forward or reverse connection status, the control device will control the energy storage system to output the forward or reverse connection prompt message to inform the user of the connection status of the current transformer.

In the above method for operating the energy storage system, the energy storage system includes the energy storage device connected to the first switching device of the energy storage system via the live wire. The first switching device is connected to the current transformer of the energy storage system via the live wire, and the current transformer is configured to access the external power grid.

By switching on the first switching device, the energy storage device can be controlled to access the external power grid, enabling charging or discharging of the energy storage device through the external power grid. When the energy storage device accesses the external power grid, and the energy storage device stops operation, the static electrical parameter of the live wire can be determined; when the energy storage device starts operation, the on-load electrical parameter of the live wire can be determined. Thereafter, based on the difference value between the on-load electrical parameter and the static electrical parameter, the connection status of the current transformer is analyzed to determine and set the operating mode of the energy storage system.

According to the technical solution, the static electrical parameter and the on-load electrical parameter of the live wires connected to the energy storage device and the current transformer can be detected and obtained respectively based on the operation condition of the energy storage device during operation of the energy storage system, and the connection status of the current transformer provided at the live wire is detected with the static electrical parameter and the on-load electrical parameter to determine and set the operating mode of the energy storage system according to the connection status of the current transformer. According to the technical solution, the connection status of the current transformer can be detected in real time, thereby obtaining the connection status of the current transformer on the live wire, avoiding long-time operation of the current transformer in reverse connection, ensuring the parameter obtainment of the current transformer in forward connection, and improving accuracy of detecting the electric current and/or power.

Referring to FIG. 4. In an example, the step 107 includes steps 402 and 404.

Step 402: determining a difference value based on the on-load electrical parameter and the static electrical parameter.

Step 404: determining the connection status of the current transformer based on the difference value and an operating mode of the energy storage device.

Specifically, after obtaining the on-load electrical parameter and static electrical parameter, the control device subtracts the static electrical parameter from the on-load electrical parameter to obtain the electrical parameter difference value. Considering that a current flow direction of the energy storage system is opposite when the energy storage device is in a charging or discharging status, to enhance the accuracy of determining the connection status of the current transformer, the technical solution of the example requires further obtaining the current operating mode of the energy storage device after obtaining the difference value, e.g., whether the energy storage system is operating in charging mode or discharging mode. Finally, the control device determines the connection status of the current transformer by combining the difference value and the operating mode.

Referring to FIG. 5, in an example, the step 107 includes steps 502 and 504.

Step 502: determining that the current transformer is in reverse connection if the difference value between the on-load electrical parameter and the static electrical parameter is negative.

Step 504: determining that the current transformer is in forward connection if the difference value is positive.

Specifically, in the technical solution of the example, the connection status of the current transformer includes a connection direction of the current transformer, specifically including forward and reverse connection of the current transformer. Taking starting operation of the energy storage device in charging mode as an example, the reverse connection of the current transformer means the connection direction of the current transformer in the live wire is opposite to the connection direction required for the charging operation of the energy storage device. The forward connection of the current transformer means the connection direction of the current transformer in the live wire is consistent with the connection direction required for charging operation of the energy storage device. Accordingly, when the energy storage device operates in discharging mode, the reverse connection of the current transformer means its connection direction in the live wire is opposite to the connection direction required for discharging operation of the energy storage device.

In the technical solution of the example, taking the operating mode of the energy storage device as charging mode as an example for explanation. In the charging mode, the electric energy from the external power grid flows via the live wire to the energy storage device, charging the energy storage device. Simultaneously, the electric energy from the external power grid flows to the electric load via the live wire, meaning that the current flow is input from the external power grid to the current transformer and is then transmitted to the live wire through the current transformer. Therefore, in the technical solution of the example, when the current transformer is in forward connection, the on-load electrical parameter will inevitably be greater than the static electrical parameter, and accordingly, the difference value between the on-load electrical parameter and the static electrical parameter will be greater than 0.

Therefore, in the technical solution of the example, if the difference value is negative, it indicates that the current transformer is in reverse connection. If the difference value is positive, it indicates that the current transformer is in forward connection. This technical solution determines the connection status of the current transformer by determining whether the difference value is negative or positive. The detection method is simple, with high detection efficiency and accuracy.

It should be noted that the technical solution in the above example may be applied to scenarios where there is one current transformer, one live wire, and the energy storage device includes one live wire end. In this scenario, the energy storage device may charge and discharge through the live wire end and live wire, and the collection of on-load electrical parameters may be achieved during this process. It can be understood that the technical solution in the above example may also be applied to scenarios where the number of current transformers, the number of live wires and the number of live wire ends are consistent and both are plural. In this scenario, the control device may sequentially control each live wire end of the energy storage device to conduct charging, thereby obtaining the on-load electrical parameters of each current transformer corresponding to the live wire respectively. The on-load electrical parameters of each live wire can be used to detect the connection direction of the connected current transformers.

It can be understood that, in another example, the connection status of the current transformer may also be detected when the energy storage device operates in discharge mode. Accordingly, in the technical solution of the example, the control device determines the on-load electrical parameters of the live wire when the current transformer discharges to the external power grid, and compares and analyzes this with the static electrical parameters of the live wire to determine the current connection status of the current transformer. The specific determination method is not limited. In an example, this may be achieved by determining the magnitude of the static and on-load electrical parameters, or by determining whether the difference value between the two falls within a certain threshold range, which will not be repeated here.

In an example, step 109 includes: verifying whether the difference value is within the preset threshold range of normal parameters when the current transformer is in forward connection; determining and setting the operating mode of the energy storage system as normal operation if the electrical parameter is within the preset threshold range of normal parameters; determining and setting the operating mode of the energy storage system as abnormal operation if the electrical parameter is not within the preset threshold range of normal parameters.

Specifically, the preset threshold range of normal parameters refers to a preset range of changes in electrical parameters of the energy storage device in charging status relative to electrical parameters of the energy storage device in closed state when the energy storage system operates normally. As shown in the above example, when the difference value between the electrical parameters is positive, the current transformer is in forward connection. At this time, the difference value between the electrical parameters may be compared with the preset threshold range of normal parameters to further determine whether the energy storage system is operating normally. Specifically, by comparing and analyzing the difference value between the electrical parameters with the preset threshold range of normal parameters, it may be determined whether the current transformer will have an impact on the normal operation of the energy storage system.

This technical solution enables further analysis to determine whether the energy storage system is operating normally when the difference value between the electrical parameters is positive, effectively improving the operational reliability of the energy storage system.

In an example, the static electrical parameter includes the static current parameter, and the on-load electrical parameter includes the on-load current parameter. Determining the static electrical parameter of the live wire when the energy storage device stops operation includes: receiving the static current parameter collected by the current transformer when the energy storage device stops operation.

Determining the on-load electrical parameter of the live wire when the energy storage device starts operation includes: receiving the on-load current parameter collected by the current transformer when the energy storage device starts operation.

Specifically, the specific type of electrical parameter is not limited, as long as it changes when the energy storage device starts operation or off. As shown in the above examples, the energy storage device may operate in either charging or discharging mode, and both modes will directly change the magnitude of the current flowing through the live wire. Therefore, the technical solution of the example directly uses the current parameters collected by the current transformer on the live wire as electrical parameters. Specifically, when the energy storage device stops operation, the current collected by the current transformer is used as the static current parameter, and when the energy storage device starts operation, the current collected by the current transformer is used as the on-load current parameter.

The above technical solution takes the current of the current transformer in different status of the energy storage device as the static current parameter and the on-load current parameter, without requiring secondary calculation and analysis of the collected parameters, which can effectively improve the efficiency of analyzing the connection status of the current transformer.

In an example, the static electrical parameter includes the static power parameter, and the on-load electrical parameter includes the on-load power parameter. Determining the static electrical parameter of the live wire when the energy storage device stops operation includes: obtaining the static voltage parameter of the live wire when the energy storage device stops operation, and receiving the static current parameter collected by the current transformer; and determining the static power parameter based on the static voltage parameter and the static current parameter.

Determining the on-load electrical parameter of the live wire when the energy storage device starts operation includes: obtaining the on-load voltage parameter of the live wire; receiving the on-load current parameter collected by the current transformer when the energy storage device starts operation; and determining the on-load power parameter based on the on-load voltage parameter and the on-load current parameter.

Specifically, as shown in the above examples, the operation of the energy storage device can be either charging or discharging. Regardless of whether it is in charging mode or discharging mode, it directly changes the magnitude of the current flowing through the live wire. When the current in the live wire changes, the corresponding power of the live wire also changes. Therefore, the technical solution of the example uses the product of the current parameter collected by the current transformer on the live wire and the voltage parameter of the live wire at the same time (e.g., the power parameter) as the electrical parameter. Specifically, when the energy storage device stops operation, the current collected by the current transformer is taken as the static current parameter, and the static voltage parameter of the live wire is also obtained. The product of the static current parameter and the static voltage parameter yields the static power parameter, which serves as the static electrical parameter. When the energy storage device starts operation, the current collected by the current transformer is taken as the on-load current parameter, and the voltage of the live wire as the on-load voltage parameter. The on-load power parameter is then derived by multiplying the on-load voltage parameter and the on-load current parameter, and the on-load power parameter serves as the on-load electrical parameter.

It should be noted that the methods for obtaining the static voltage parameter and on-load voltage parameter are not limited. In a more detailed example, a voltage acquisition device may be installed in the energy storage system and connected to the control device. The voltage acquisition device collects the voltage on the live wire between the energy storage device and the external power grid, thereby obtaining the on-load voltage parameter or the static voltage parameter.

The above technical solution uses the power parameter of the live wire, corresponding to different statuses of the energy storage device, as the static electrical parameter and the on-load electrical parameter to analyze the connection status of the current transformer. The connection status of the current transformer is correlated with the power change of the live wire, achieving high analysis accuracy.

It should be noted that the number of live wires is not limited. As shown in the above example, in practical scenarios, the energy storage system may be provided with one live wire or with two or more live wires without limitation. For the purpose of explanation, the number of live wires is two, and each live wire is connected to a corresponding current transformer.

Figure 6:
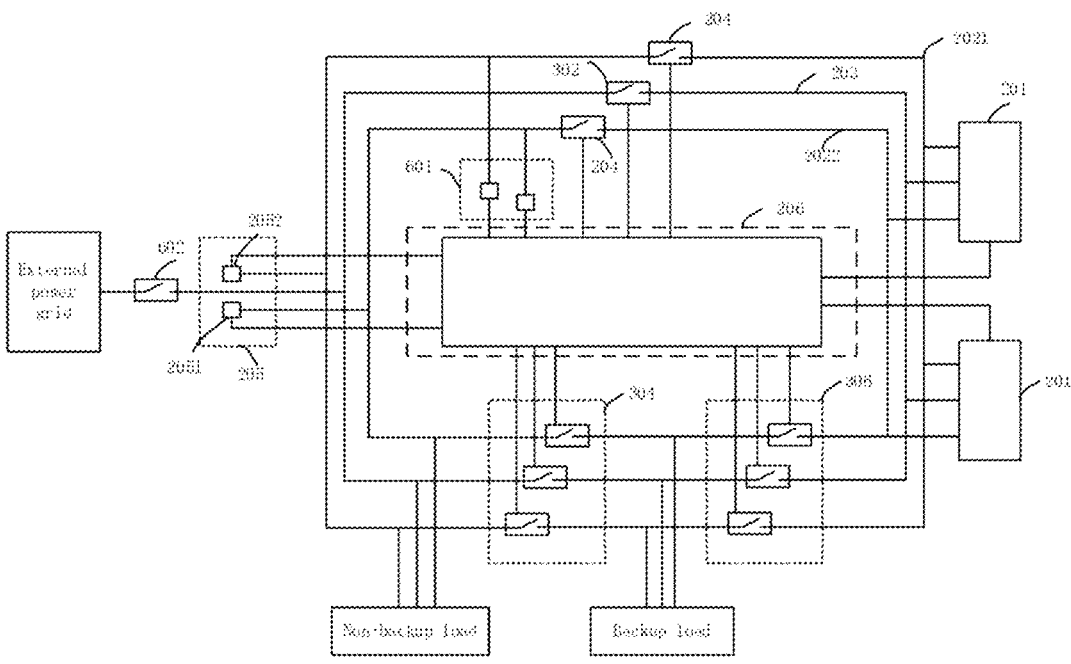
FIG. 6 is a schematic structural diagram of an energy storage system according to yet another example of the present disclosure.

Referring to FIG. 6, in an example, the live wire includes a first live wire 2021 and a second live wire 2022. The current transformer includes a first current transformer 2051 and a second current transformer 2052. The first live wire end of the energy storage device 201 is connected to the first switching device 204 via the first live wire 2021. The first switching device 204 is connected to the first current transformer 2051 via the first live wire 2021. Similarly, the second live wire end 2022 of the energy storage device 201 is connected to the first switching device 204 via the second live wire 2022. The first switching device 204 is further connected to the second current transformer 2052 via the second live wire 2022.

Step 103 includes: determining a first static electrical parameter of the first live wire 2021 and a second static electrical parameter of the second live wire 2022 respectively when the energy storage device 201 stops operation.

Step 105 includes: determining a first on-load electrical parameter of the first live wire 2021 and a second on-load electrical parameter of the second live wire 2022 respectively when the energy storage device 201 starts operation via the first live wire 2021.

Specifically, the energy storage device 201 operates via the first live wire 2021, which means that the energy storage device 201 transmits energy to or from the external power grid via the first live wire 2021. The live wire end connected to the first live wire 2021 in the energy storage device 201 is charged or discharged via the first live wire 2021. The technical solution of the example allows for individual electrical parameter analysis and calculation on each live wire, corresponding to the number of live wires. For each live wire, one electrical parameter may be analyzed and calculated. Specifically, when the energy storage device 201 stops operation, electrical parameter collection and analysis may be performed respectively on the first live wire 2021 and the second live wire 2022 to determine the first static electrical parameter and the second static electrical parameter. The first static electrical parameter and the second static electrical parameter may be of the same type, both of which may be the static current parameter or the static power parameter, without limitation. When the energy storage device 201 starts operation, electrical parameter collection and analysis may be performed respectively on the first live wire 2021 and the second live wire 2022 to obtain the first on-load electrical parameter and the second on-load electrical parameter. The first on-load electrical parameter and the second on-load electrical parameter may be of the same type, both of which may be the on-load current parameter or the on-load power parameter, without limitation, as long as they are of the same type as the static electrical parameter.

The above technical solution may control one of the live wire ends to perform charging or discharging when the energy storage device 201 includes two live wire ends for power transmission, thereby enabling the detection of the connection status of the two current transformers and providing enhanced detection convenience.

In an example, step 107 includes: determining the first connection status of the first current transformer 2051 connected to the first live wire 2021 based on the first difference value between the first on-load electrical parameter and the first static electrical parameter; determining the second connection status of the second current transformer 2052 connected to the second live wire 2022 based on the second difference value between the second on-load electrical parameter and the second static electrical parameter.

Specifically, in the technical solution of the example, for the first live wire 2021, the connection status of the first current transformer 2051 connected to the first live wire 2021 can be determined by analyzing the first on-load electrical parameter and the first static electrical parameter corresponding to the first live wire 2021. Similarly, for the second live wire 2022, the connection status of the second current transformer 2052 connected to the second live wire 2022 can be determined by analyzing the second on-load electrical parameter and the second static electrical parameter corresponding to the second live wire 2022. Through this method, the first connection status of the first current transformer 2051 and the second connection status of the second current transformer 2052 are respectively determined based on their corresponding on-load electrical parameter and static electrical parameter, achieving high detection accuracy.

In an example, determining the connection status of the current transformer includes: determining a connection direction and/or connection position of the current transformer.

Specifically, in an example, determining the first connection status of the first current transformer 2051 connected to the first live wire 2021 based on the first difference value between the first on-load electrical parameter and the first static electrical parameter includes: determining the connection direction and/or connection position of the first current transformer 2051 connected to the first live wire 2021 based on the first difference value between the first on-load electrical parameter and the first static electrical parameter.

Determining the second connection status of the second current transformer 2052 connected to the second live wire 2022 based on the second difference value between the second on-load electrical parameter and the second static electrical parameter includes: determining the connection direction and/or connection position of the second current transformer 2052 connected to the second live wire 2022 based on the second difference value between the second on-load electrical parameter and the second static electrical parameter.

Specifically, in the example, for application scenarios where the number of current transformers 205 is two or more, the connection status of the current transformers 205 includes the connection direction and/or connection position. The connection direction is the forward or reverse connection of current transformer 205 on the live wire, which will not be repeated here. The connection position refers to the position of the live wire to which the current transformer 205 is presently coupled, e.g., whether the current transformer 205 is connected to the corresponding live wire. For example, there are errors such as the first current transformer 2051 being connected to the second live wire 2022, and the second current transformer 2052 being connected to the first live wire 2021.

The method for determining the connection direction of the current transformer 205 is shown in the above examples and will not be repeated here. Taking two current transformers 205 as an example, the specific method for determining the connection position of current transformers 205 is as follows: firstly, determining the first static electrical parameter of the first live wire 2021 and the second static electrical parameter of the second live wire 2022 respectively when the energy storage device 201 stops operation. Thereafter, the connection of the first live wire 2021 is controlled to charge (or discharge, taking charging as an example in the example) the energy storage device 201. At this time, the first on-load electrical parameter of the first live wire 2021 and the second on-load electrical parameter of the second live wire 2022 is determined. If the difference value between the first on-load electrical parameter and the first static electrical parameter is detected to be positive and within the preset electrical parameter range, it indicates that the first current transformer 2051 is in forward connection and connected to the first live wire 2021. If the difference value between the first on-load electrical parameter and the first static electrical parameter is detected to be negative, it indicates that the first current transformer 2051 is in reverse connection at this time. If the difference value between the second on-load electrical parameter and the second static electrical parameter is detected to be positive and within the preset electrical parameter range, it indicates that the second current transformer 2052 is in forward connection, but connected to the first live wire 2021 (at this time, the connection position of the second current transformer 2052 is incorrect). If the difference value between the first on-load electrical parameter and the first static electrical parameter is detected to be positive, but not within the preset electrical parameter range, it indicates that the first current transformer 2051 is in forward connection, but connected to the second live wire 2022.

Thereafter, the first live wire 2021 is controlled to be disconnected and the second live wire 2022 is controlled to be connected to charge the energy storage device 201. At this time, a third on-load electrical parameter of the first live wire 2021 and a fourth on-load electrical parameter of the second live wire 2022 are obtained. If the difference value between the fourth on-load electrical parameter and the second static electrical parameter is detected to be positive and within the preset electrical parameter range, it indicates that the second current transformer 2052 is in forward connection and connected to the second live wire 2022. If the difference value between the fourth on-load electrical parameter and the second static electrical parameter is detected to be negative, it indicates that the second current transformer 2052 is in reverse connection at this time; If the difference value between the third on-load electrical parameter and the first static electrical parameter is detected to be positive and within the preset electrical parameter range, it indicates that the first current transformer 2051 is in forward connection, but connected to the second live wire 2022 (at this time, the connection position of the first current transformer 2051 is incorrect). If the difference value between the fourth on-load electrical parameter and the second static electrical parameter is detected to be positive, but not within the preset electrical parameter range, it indicates that the second current transformer 2052 is in forward connection, but connected to the first live wire 2021.

Through the above technical solution, the connection direction and/or connection position of current transformer 205 can be determined, further enhancing the reliability of determining its connection status.

It should be noted that the size of the preset electrical parameter range is not limited. Depending on the operating status or mode of the energy storage device 201 or the type of electrical parameter, the preset electrical parameter range may also be set differently. Specific settings may be made based on the actual scenario. For example, in an example, the preset electrical parameter range may be the charging current range (or charging power range) that may be achieved when the energy storage device opens a live wire end for charging. In another example, when the energy storage device opens a live wire end for charging, the range of plus or minus 20% of the rated charging current (power) may be used as the preset electrical parameter range, e.g., the range from (1−20%)*P rating to (1+20%)*P rating, where P rating represents the rated charging power (or rated charging current).

In an example, the method for operating the energy storage system further includes: determining the third on-load electrical parameter of the first live wire 2021 and the fourth on-load electrical parameter of the second live wire 2022 respectively when the energy storage device 201 starts operation via the second live wire 2022; determining the third connection status of the first current transformer 2051 based on the third difference value between the third on-load electrical parameter and the first static electrical parameter; determining the fourth connection status of the second current transformer 2052 based on the fourth difference value between the fourth on-load electrical parameter and the second static electrical parameter; and determining the connection status of the first current transformer 2051 and the second current transformer 2052 based on the first connection status, the second connection status, the third connection status, and the fourth connection status.

Specifically, the energy storage device 201 operates via the second live wire 2022, which means that the energy storage device 201 transmits energy to or from the external power grid via the second live wire 2022. The live wire end connected to the second live wire 2022 in the energy storage device 201 is used for charging or discharging via the second live wire 2022. In the technical solution of the example, charging or discharging may first be performed on any live wire end of the energy storage device to obtain the first connection status of the first current transformer 2051 and the second connection status of the second current transformer 2052. Subsequently, the same method may be applied to the other live wire end to charge or discharge, achieving another analysis of the connection status of the current transformer. Thereafter, the control device compares the connection status obtained from the two analyses to achieve a secondary confirmation of the connection status of the current transformer, further improving the accuracy of the connection status of the current transformer.

It should be noted that in other examples, the number of live wires, current transformers, and live wire ends of an energy storage device may be provided more, such as three. At this time, the connection method of the live wires, current transformers, and live wire ends of the energy storage device is similar to the above examples and will not be repeated here. In the technical solution of the example, the same method may be applied to obtain the static electrical parameter of each live wire when all live wire ends of the energy storage device are connected. Likewise, the same method may be applied to obtain the on-load electrical parameter of each live wire when any live wire end of the energy storage device is disconnected, thereby achieving the analysis of the connection status of each current transformer.

Thereafter, at least one of the remaining live wire ends of the energy storage device may be controlled to operate, and the on-load electrical parameter of each live wire may be determined again to verify the connection status of the current transformer. It can be understood that this could involve controlling one of the remaining live wire ends of the energy storage device to operate, achieving secondary confirmation of the connection status of the current transformer, or controlling two of the remaining live wire ends of the energy storage device to operate, achieving tertiary confirmation of the connection status of the current transformer, etc., without limitation.

In an example, determining the connection status of the first current transformer 2051 and the second current transformer 2052 based on the first connection status, the second connection status, the third connection status, and the fourth connection status includes: determining the connection status of the first current transformer 2051 as the first connection status and the connection status of the second current transformer 2052 is the second connection status if the first connection status is consistent with the third connection status and the second connection status is consistent with the fourth connection status; and returning to the step of determining the static electrical parameter of the live wire when the energy storage device stops operation if the first connection status is inconsistent with the third connection status and/or the second connection status is inconsistent with the fourth connection status.

Specifically, in the example, when the third connection status of the first current transformer 2051 as obtained from the second analysis is detected to be inconsistent with the first connection status, or when the fourth connection status of the second current transformer 2052 obtained from the second analysis is detected to be inconsistent with the second connection status, it is determined that there is an issue with the current connection status analysis. To further improve the accuracy of the analysis of the connection status of the current transformer, the control device will return to obtain the static electrical parameter again and analyze the current transformer for reverse connection until the third connection status of the first current transformer 2051 as obtained from the second analysis is consistent with the first connection status, and the fourth connection status of the second current transformer 2052 as obtained from the second analysis is consistent with the second connection status.

Referring to FIG. 7, in an example, the step 109 includes steps 702 and 704.

Step 702: controlling the energy storage system to operate in current status when the current transformer is in the forward connection and in a correct connection position.

Step 704: outputting an abnormal prompt message when the current transformer is in reverse connection and/or in an incorrect connection position.

Specifically, a specific form of normal connection of the current transformer 205 is not limited. For the application scenario involving a single current transformer 205 and a single live wire 202, a normal connection of the current transformer 205 means that the connection direction of current transformer 205 is in forward connection, while an abnormal connection of the current transformer 205 means that the current transformer 205 is in reverse connection. For the application scenario involving a plurality of current transformers 205 and a plurality of live wires 202, the normal connection of the current transformer 205 requires that all current transformers 205 are in forward connection and that each current transformer 205 is connected to the correct live wire 202. For example, the first current transformer 2051 needs to be connected to the first live wire 2021, and the second current transformer 2052 needs to be connected to the second live wire 2022. Abnormal connection of the current transformer 205 means that at least one current transformer 205 is in reverse connection, and/or that at least one current transformer 205 is connected to an incorrect live wire 202.

The technical solution of the example does not require additional processing when the current transformer is connected normally, and will maintain the energy storage system operating in its current state. When the current transformer is connected abnormally, the control device will output an abnormal prompt message through sound, light, or other means to remind the user of the abnormal connection status of the current transformer. Through this technical solution, users will be promptly alerted when the current transformer is connected abnormally, enabling them to make adjustments and effectively improve the operational reliability of the energy storage system.

In an example, step 109 further includes outputting an error prompt message and/or controlling the energy storage system to stop operating if the abnormal connection of the current transformer is continuously detected within a preset duration.

Specifically, in the example, the connection status of the current transformer is continuously detected. If abnormal connection of the current transformer is continuously detected within a preset duration, the control device will perform error reporting or control the energy storage system to stop operating, to prevent the energy storage system from operating in an abnormal status for a long time and further improve the operational safety of the energy storage system.

It should be noted that the preset duration is not limited and may be set according to the frequency of detecting the connection status of the current transformer, without limitation. For example, in an example, the preset duration may be set to three days, four days, five days, etc.

In an example, step 101 includes: controlling the energy storage device of the energy storage system to access the external power grid at a preset interval; and/or upon receiving a start-up command for the energy storage system to start operation, controlling the energy storage device of the energy storage system to access the external power grid.

Specifically, the frequency of detecting the connection status of the current transformer is not limited. In an example, a preset interval can be defined, and the connection status can be detected at every preset interval, thus achieving periodic detection of the connection status of the current transformer. In another example, it is also possible to detect connection status every time the energy storage system starts operating, e.g., when the energy storage system receives a start-up command, without limitation.

More specifically, in an example, periodic detection of the connection status may also be performed in addition to detecting the connection status every time the energy storage system starts operation, without limitation.

The above technical solution configures the timing for detecting the connection status of the current transformer according to actual needs, achieving self-checking of the connection status and improving the reliability of detection.

Referring to FIG. 6, to facilitate understanding of the technical solution disclosed herein, the following provides a more detailed explanation of the present disclosure through examples.

Firstly, when the timer reaches the preset interval period or the energy storage system starts operation, the first switching device 204 is controlled to close, so that the energy storage device 201 is connected to the external power grid. Thereafter, when controlling the energy storage device 201 to disable charging (and discharging), the first static current parameter of the first current transformer 2051 between the first live wire 2021 and the external power grid, and the second static current parameter of the second current transformer 2052 between the second live wire 2022 and the external power grid are obtained. In this status, the first static voltage parameter of the first live wire 2021 and the second static voltage parameter of the second live wire 2022 are also collected and obtained based on the voltage acquisition device 601 on the first live wire 2021 and the voltage acquisition device 601 on the second live wire 2022. The control device calculates the first static power parameter of the first live wire 2021 based on the first static current parameter and the first static voltage parameter, and calculates the second static power parameter of the second live wire 2022 based on the second static current parameter and the second static voltage parameter.

Thereafter, the control device communicates with the energy storage device 201 and controls the first live wire end of the energy storage device 201 to start charging. At this time, the control device obtains the first on-load current parameter of the first current transformer 2051 and the second on-load current parameter of the second current transformer 2052. In this state, the first on-load voltage parameter of the first live wire 2021 and the second on-load voltage parameter of the second live wire 2022 are also collected and obtained based on the voltage acquisition device 601 provided on the first live wire 2021 and the voltage acquisition device 601 provided on the second live wire 2022. The control device calculates the first on-load power parameter of the first live wire 2021 based on the first on-load current parameter and the first on-load voltage parameter, and calculates the second on-load power parameter of the second live wire 2022 based on the second on-load current parameter and the second on-load voltage parameter.

Thereafter, the control device analyzes the first difference value between the first on-load power parameter and the first static power parameter, as well as the second difference value between the second on-load power parameter and the second static power parameter. The first difference value is used to obtain the first connection status of the first current transformer 2051 at this time, and the second difference value is used to obtain the second connection status of the second current transformer 2052 at this time. Specifically, if the difference value is negative, the current transformer is in reverse connection. If the difference value is positive, further analysis is performed to determine whether it is within the preset threshold range of electrical parameters. If it is not within the preset range of electrical parameters, it is determined that the connection position is incorrect (e.g., the first current transformer 2051 is connected to the second live wire 2022, or the second current transformer 2051 is connected to the first live wire 2021). If it is within the preset threshold range of electrical parameters, it is determined that the connection position is correct. By this method, the first difference value and the second difference value are analyzed respectively to obtain the connection status of the first current transformer 2051 and the second current transformer 2052, e.g., whether they are in forward connection and/or whether the position of the live wire is correct. At this point, the first and second connection status may be directly used as analysis results to control the operation of the energy storage system, or further secondary verification may be performed.

During the secondary verification, the control device communicates with the energy storage device 201 and controls the second live wire 2022 end of the energy storage device 201 to start charging. At this time, the control device obtains the third on-load current parameter of the first current transformer 2051 and the fourth on-load current parameter of the second current transformer 2052. In this state, the third on-load voltage parameter of the first live wire 2021 and the fourth on-load voltage parameter of the second live wire 2022 are also collected and obtained based on the voltage acquisition device 601 provided on the first live wire 2021 and the voltage acquisition device 601 provided on the second live wire 2022. The control device calculates the third on-load power parameter of the first live wire 2021 based on the third on-load current parameter and the third on-load voltage parameter, and calculates the fourth on-load power parameter of the second live wire 2022 based on the fourth on-load current parameter and the fourth on-load voltage parameter.

Thereafter, the control device analyzes the third difference value between the third on-load power parameter and the first static power parameter, as well as the fourth difference value between the fourth on-load power parameter and the second static power parameter. In a similar manner as described above, the third connection status of the first current transformer 2051 at this time is determined based on the third difference value, and the fourth connection status of the second current transformer 2052 at this time is determined based on the fourth difference value.

Finally, when the first connection status is consistent with the third connection status, and the second connection status is consistent with the fourth connection status, it is determined that the connection status of the first current transformer 2051 is the first connection status, and the connection status of the second current transformer 2052 is the second connection status. When both the first connection status and second connection status are in forward connection status, the energy storage system is controlled to continue operation. When either the first connection status or the second connection status is in reverse connection status, a corresponding reverse connection prompt message is output.

When the first connection status is inconsistent with the third connection status, and/or when the second connection status is inconsistent with the fourth connection status, the process returns to obtain the first static power parameter of the first live wire 2021 and the second static power parameter of the second live wire 2022 when the energy storage device 201 stops operation. The connection status is then reanalyzed until the first connection status is consistent with the third connection status and the second connection status is consistent with the fourth connection status finally.

Referring to FIG. 2, the present disclosure further provides an energy storage system, including an energy storage device 201, a first switching device 204, a current transformer 205, and a control device 206. The first end of the first switching device 204 is connected to the energy storage device 201 via a live wire 202, and the second end of the first switching device 204 is connected to the current transformer 205 via a live wire 202. The current transformer 205 is configured to access the external power grid, and the control device 206 is configured to perform the steps of the above method for operating the energy storage system.

Specifically, the implementation methods of the energy storage system operation are as shown in the above examples and accompanying drawings, and will not be repeated here. The above energy storage system includes an energy storage device 201 connected to the first switching device 204 of the energy storage system via a live wire 202. The first switching device 204 is connected to the current transformer 205 of the energy storage system via another live wire 202. The current transformer 205 is also configured to access an external power grid. By switching on the first switching device 204, the energy storage device 201 can be controlled to access the external power grid, thereby enabling the charging or discharging of the energy storage device 201 through the external power grid. When the energy storage device 201 is connected to the external power grid, and the energy storage device 201 stops operation, the static electrical parameter of the live wire 202 can be determined at this time. When the energy storage device 201 starts operation, the on-load electrical parameter of the live wire 202 can be determined at this time. Thereafter, based on the difference value between the on-load electrical parameter and the static electrical parameter, the connection status of the current transformer 205 is analyzed to determine and set the operating mode of the energy storage system. This technical solution enables the connection status of the current transformer 205 to be detected during the operation of the energy storage system, and allows the operating mode of the energy storage system to be determined or set based on the connection status of the current transformer 205. According to this technical solution, the connection status of the current transformer 205 can be detected in real time, thereby obtaining the connection status of the current transformer 205 on the live wire 202, avoiding long-time operation of the current transformer 205 in reverse connection, ensuring the parameter obtainment of the current transformer 205 in forward connection, and improving accuracy of detecting the electric current and/or power.

Referring to FIG. 3, in an example, the energy storage system further includes a second switching device 302. The neutral wire 203 of the energy storage device 201 is connected to the second switching device 302 via the neutral wire 203. The second switching device 302 is respectively connected to the external power grid and the electric load via the neutral wire 203.

Specifically, to enhance the operational safety of the energy storage system, a second switching device 302 may also be installed on the neutral wire 203 of the energy storage system. The neutral wire 203 end of the energy storage device 201 is connected to the second switching device 302 via the neutral wire 203, and the second switching device 302 is connected to the external power grid and electric load via the neutral wire 203. Accordingly, in the technical solution of the example, controlling the energy storage device 201 to access the external power grid requires simultaneously switching on both the first switching device 204 and the second switching device 302.

Furthermore, in one example, to prevent the electric load from affecting the accuracy of the connection status analysis of the current transformer 205, the energy storage system further includes a third switching device 304 and a fourth switching device 306. Referring to FIG. 3, the electric load includes a non-backup load and a backup load. The non-backup load is connected to the external power grid via the live wire 202 and operates directly with electric energy transmitted by the external power grid. The third switching device 304 is positioned on the live wire 202 between the non-backup load and the backup load, while the fourth switching device 306 is positioned on the live wire 202 between the backup load and the energy storage device 201. In this configuration, when the energy storage device 201 stops operating, the non-backup load can continue to operate with the electric energy transmitted by the external power grid. When both the third switching device 304 and the fourth switching device 306 are switched off, the backup load stops operating. When the third switching device 304 is switched on and the fourth switching device 306 is switched off, the backup load can begin operating with the electric energy transmitted by the external power grid. When the energy storage device 201 starts operation, and the third switching device 304 is switched off while the fourth switching device 306 is switched on, the backup load can operate with the electric energy transmitted by the energy storage device 201.

It can be understood that in another example, to enhance electrical safety, the third switching device 304 may be provided on both the live wire 202 and the neutral wire 203 between the non-backup load and the backup load. Similarly, the fourth switching device 306 may be provided on both the live wire 202 and the neutral wire 203 between the backup load and the energy storage device 201.

Accordingly, when the above energy storage system further includes a third switching device 304 and a fourth switching device 306, controlling the energy storage device 201 of the energy storage system to access the external power grid requires switching on the first switching device 204 and simultaneously switching off the third switching device 304 and the fourth switching device 306.

In an example, the number of current transformers 205 is two or more, with each current transformer 205 connected to the first switching device 204 via a live wire 202.

Specifically, in the example, the number of live wires 202, the number of live wire ends of the energy storage device 201, and the number of current transformers 205 are identical. Each live wire end of the energy storage device 201 is connected to the first switching device 204 via a live wire 202, and the first switching device 204 is respectively connected to each current transformer 205 via a live wire 202.

Specifically, the number of current transformers 205 may be two, e.g., the live wire 202 includes a first live wire 2021 and a second live wire 2022. The current transformer 205 includes a first current transformer 2051 and a second current transformer 2052. The first live wire end of the energy storage device 201 is connected to the first switching device 204 via the first live wire 2021, and the first switching device 204 is connected to the first current transformer 2051 via the first live wire 2021. The second live wire end of the energy storage device 201 is connected to the first switching device 204 via the second live wire 2022, and the first switching device 204 is also connected to the second current transformer 2052 via the second live wire 2022.

In this way, after any one of the live wire ends of the energy storage device 201 starts operation for charging or discharging, the first connection status of the first current transformer 2051 and the second connection status of the second current transformer 2052 are determined, the same method can also be used to control the other live wire end to be connected for charging or discharging, achieving a subsequent analysis of the connection status of the current transformer 205. Thereafter, the control device 206 will compare the connection status obtained from the two analyses to achieve a secondary confirmation of the connection status of the current transformer 205, further improving the accuracy of the connection status of the current transformer 205.

It should be noted that in other examples, the number of live wires 202, current transformers 205, and live wire ends of energy storage device 201 may be provided more, such as three. At this time, the connection method of live wires 202, current transformers 205, and live wire ends of the energy storage device 201 is similar to the above examples and will not be repeated here. In the technical solution of the example, the same method may be applied to obtain the static electrical parameter of each live wire 202 when all live wire ends of the energy storage device 201 are disconnected. Likewise, the same method may be applied to obtain the on-load electrical parameter of each live wire 202 when any live wire end of the energy storage device 201 is connected, thereby achieving the analysis of the connection status of each current transformer 205.

Thereafter, at least one of the remaining live wire ends of the energy storage device 201 may be controlled to operate, and the on-load electrical parameter of each live wire 202 may be determined again to verify the connection status of the current transformer 205. It can be understood that this could involve controlling one of the remaining live wire ends of the energy storage device 201 to operate, achieving secondary confirmation of the connection status of the current transformer 205, or controlling two of the remaining live wire ends of the energy storage device 201 to operate, achieving tertiary confirmation of the connection status of the current transformer 205, etc., without limitation.

Referring to FIG. 6, in an example, there is also a voltage acquisition device 601 connected to the control device 206, which is installed on the live wire 202.

Specifically, in the example, the product of the current parameter collected by the current transformer 205 on the live wire 202 and the voltage parameter of the live wire 202 at the same time (e.g., the power parameter) is taken as the electrical parameter. Specifically, when the energy storage device 201 stops operation, the current collected by the current transformer 205 is taken as the static current parameter, and the static voltage parameter of the live wire 202 is also obtained. The product of the static voltage parameter and the static current parameter yields the static power parameter, which serves as the static electrical parameter. When the energy storage device 201 starts operation, the current collected by the current transformer 205 is taken as the on-load current parameter, and the voltage of the live wire 202 as the on-load voltage parameter. The on-load power parameter is then derived by multiplying the on-load voltage parameter and the on-load current parameter, and the on-load power parameter, serves as the on-load electrical parameter.

The methods for obtaining the static voltage parameter and the on-load voltage parameter are not limited. In the example, a voltage acquisition device 601 may be installed in the energy storage system, which is connected to the control device 206. The voltage on the live wire 202 between the energy storage device 201 and the external power grid may be collected through the voltage acquisition device 601 to obtain the on-load voltage parameter or the static voltage parameter.

Furthermore, referring to FIG. 6, in an example, in order to enhance the operational reliability of the energy storage system, a main switch 602 is further provided between the external power grid and the current transformer 205. The main switch 602 enables one-touch disconnection control between the energy storage system and the external power grid.

Various technical features of the above examples can be combined arbitrarily. To make the description concise, not all possible combinations of the technical features in the examples are described. However, as long as no contradiction occurs between the combinations of these technical features, the combinations should be considered within the scope of the description.

The examples described above represent only several examples of the present disclosure, which are described in detail but should not be construed as limitations of the scope of the disclosure. It should be noted that several variations and improvements can be made without departing from the spirit of the disclosure for those skilled in the art, all of which fall within the scope of the present disclosure. Accordingly, the scope of the present disclosure should be subject to the appended claims.

What is claimed is:

1. A method for operating an energy storage system comprising an energy storage device, a first switching device, and a current transformer, wherein the method for operating the energy storage system comprises:

controlling the energy storage device of the energy storage system to access an external power grid, wherein a first end of the first switching device is coupled to the energy storage device via a live wire, and a second end of the first switching device is coupled to the current transformer via the live wire, the current transformer is coupled to the external power grid;

determining a static electrical parameter of the live wire based on that the energy storage device stops operation;

determining an on-load electrical parameter of the live wire based on that the energy storage device starts operation;

determining a connection status of the current transformer based on a difference value between the on-load electrical parameter and the static electrical parameter; and setting an operating mode of the energy storage system based on the connection status.

2. The method of claim 1, wherein determining the connection status of the current transformer comprises at least one of followings:

determining that the current transformer is in reverse connection based on that the difference value between the on-load electrical parameter and the static electrical parameter is negative; or determining that the current transformer is in forward connection based on that the difference value is positive.

3. The method of claim 2, further comprising:

verifying whether the difference value is within a preset threshold range of normal parameters based on that the current transformer is in forward connection;

wherein setting the operation mode of the energy storage system comprises at least one of:

setting the operating mode of the energy storage system as normal operation based on that the difference value is within the preset threshold range of normal parameters; or setting the operating mode of the energy storage system as abnormal operation based on that the difference value is not within the preset threshold range of normal parameters.

4. The method of claim 1, wherein the live wire comprises a first live wire and a second live wire, the current transformer comprises a first current transformer and a second current transformer, the first switching device is coupled to the first current transformer via the first live wire, and is coupled to the second current transformer via the second live wire;

wherein determining the static electrical parameter of the live wire comprises: determining a first static electrical parameter of the first live wire and a second static electrical parameter of the second live wire separately; and wherein determining the on-load electrical parameter of the live wire comprises: determining a first on-load electrical parameter of the first live wire and a second on-load electrical parameter of the second live wire separately based on that the energy storage device starts operation via the first live wire.

5. The method of claim 4, wherein determining the connection status of the current transformer comprises:

determining first connection status of the first current transformer coupled to the first live wire based on a first difference value between the first on-load electrical parameter and the first static electrical parameter; and determining second connection status of the second current transformer coupled to the second live wire based on a second difference value between the second on-load electrical parameter and the second static electrical parameter.

6. The method of claim 1, wherein determining the connection status of the current transformer comprises determining at least one of a connection direction or a connection position of the current transformer.

7. The method of claim 5, further comprising:

determining a third on-load electrical parameter of the first live wire and a fourth on-load electrical parameter of the second live wire separately based on that the energy storage device starts operation via the second live wire;

determining third connection status of the first current transformer based on a third difference value between the third on-load electrical parameter and the first static electrical parameter;

determining fourth connection status of the second current transformer based on a fourth difference value between the fourth on-load electrical parameter and the second static electrical parameter; and determining the connection status of the first current transformer and the second current transformer based on the first connection status, the second connection status, the third connection status, and the fourth connection status.

8. The method of claim 7, wherein determining the connection status of the first current transformer and the second current transformer comprises:

determining the connection status of the first current transformer as the first connection status and the connection status of the second current transformer as the second connection status based on that the first connection status is consistent with the third connection status and the second connection status is consistent with the fourth connection status; and returning to determining the static electrical parameter of the live wire after determining that the energy storage device stops operation based on that:

the first connection status is inconsistent with the third connection status and/or the second connection status is inconsistent with the fourth connection status.

9. The method of claim 1, wherein controlling the energy storage device comprises:

controlling the energy storage device of the energy storage system to access the external power grid at a preset interval.

10. The method of claim 1, wherein controlling the energy storage device comprises:

after receiving a start-up command for the energy storage system to start operation, controlling the energy storage device of the energy storage system to access the external power grid.

11. An energy storage system comprising:

an energy storage device, a first switching device, a current transformer, wherein a first end of the first switching device is coupled to the energy storage device via a live wire, a second end of the first switching device is coupled to the current transformer via the live wire, and the current transformer is coupled to an external power grid; and a control device configured to:

control the energy storage device of the energy storage system to access the external power grid;

determine a static electrical parameter of the live wire after determining that the energy storage device stops operation;

determine an on-load electrical parameter of the live wire after determining that the energy storage device starts operation;

determine a connection status of the current transformer based on a difference value between the on-load electrical parameter and the static electrical parameter; and set an operating mode of the energy storage system based on the connection status.

12. The energy storage system of claim 11, wherein the control device is configured to determine the connection status of the current transformer by at least one of followings:

determining that the current transformer is in reverse connection based on that the difference value between the on-load electrical parameter and the static electrical parameter is negative; or determining that the current transformer is in forward connection based on that the difference value is positive.

13. The energy storage system of claim 12, wherein the control device is configured to set the operating mode of the energy storage system by:

verifying whether the difference value is within a preset threshold range of normal parameters after determining that the current transformer is in forward connection;

setting the operating mode of the energy storage system as normal operation based on that the difference value is within the preset threshold range of normal parameters; or setting the operating mode of the energy storage system as abnormal operation based on that the difference value is not within the preset threshold range of normal parameters.

14. The energy storage system of claim 11, wherein the live wire comprises a first live wire and a second live wire, the current transformer comprises a first current transformer and a second current transformer, the first switching device is coupled to the first current transformer via the first live wire, and is coupled to the second current transformer via the second live wire;

wherein the control device is configured to determine the static electrical parameter of the live wire by: determining a first static electrical parameter of the first live wire and a second static electrical parameter of the second live wire separately; and wherein the control device is configured to determine the on-load electrical parameter of the live wire by: determining a first on-load electrical parameter of the first live wire and a second on-load electrical parameter of the second live wire separately after determining that the energy storage device starts operation via the first live wire.

15. The energy storage system of claim 14, wherein the control device is configured to determine the connection status of the current transformer by:

determining first connection status of the first current transformer coupled to the first live wire based on a first difference value between the first on-load electrical parameter and the first static electrical parameter; and determining second connection status of the second current transformer coupled to the second live wire based on a second difference value between the second on-load electrical parameter and the second static electrical parameter.

16. The energy storage system of claim 11, wherein the control device is configured to determine the connection status of the current transformer by:

determining a connection direction and/or a connection position of the current transformer.

17. The energy storage system of claim 15, wherein the control device is further configured to:

determine a third on-load electrical parameter of the first live wire and a fourth on-load electrical parameter of the second live wire separately after determining that the energy storage device starts operation via the second live wire;

determine third connection status of the first current transformer based on a third difference value between the third on-load electrical parameter and the first static electrical parameter;

determine fourth connection status of the second current transformer based on a fourth difference value between the fourth on-load electrical parameter and the second static electrical parameter; and determine the connection status of the first current transformer and the second current transformer based on the first connection status, the second connection status, the third connection status, and the fourth connection status.

18. The energy storage system of claim 17, wherein the control device is configured to determine the connection status of the first current transformer and the second current transformer by:

determining the connection status of the first current transformer as the first connection status and the connection status of the second current transformer as the second connection status after determining that the first connection status is consistent with the third connection status and the second connection status is consistent with the fourth connection status; and returning to determining the static electrical parameter of the live wire after determining that the energy storage device stops operation based on at least one of conditions comprising:

the first connection status is inconsistent with the third connection status; or the second connection status is inconsistent with the fourth connection status.

19. The energy storage system of claim 11, wherein the control device is further configured to:

control the energy storage device of the energy storage system to access the external power grid at a preset interval.

20. A control device for an energy storage system comprising an energy storage device, a first switching device and a current transformer, wherein a first end of the first switching device is coupled to the energy storage device via a live wire, a second end of the first switching device is coupled to the current transformer via the live wire, and the current transformer is coupled to an external power grid, and wherein the control device is configured to:

control the energy storage device to access the external power grid;

determine a static electrical parameter of the live wire based on that the energy storage device stops operation;

determine an on-load electrical parameter of the live wire based on that the energy storage device starts operation;

determine a connection status of the current transformer based on a difference value between the on-load electrical parameter and the static electrical parameter, wherein the current transformer is coupled to the external power grid; and set an operating mode of the energy storage system based on the connection status.

* * * * *